United States Patent
Bayle et al.

[15] 3,706,988
[45] Dec. 19, 1972

[54] VEHICLE CONTROLLER EMPLOYING PASSIVE HORIZON SENSOR

[72] Inventors: Guy P. Bayle, Orange; Richard K. Smyth, Fullerton, both of Calif.; Robert D. Gustafson, West Lafayette, Ind.

[73] Assignee: North American Aviation, Inc.

[22] Filed: Nov. 4, 1965

[21] Appl. No.: 506,295

[52] U.S. Cl.................343/6 R, 244/77 D, 343/7 TA, 343/100 ME
[51] Int. Cl..............................................G01s 9/02
[58] Field of Search.......343/6, 7, 7 TA, 6 R; 244/77, 244/77 D

[56] References Cited

UNITED STATES PATENTS

| 3,404,398 | 10/1968 | Hoban et al. | 343/7 TA |
| 3,004,219 | 10/1961 | Albert | 343/7 UX |
| 3,210,760 | 10/1965 | Olson et al. | 343/7 |

*Primary Examiner*—T. H. Tubbesing
*Attorney*—William R. Lane, L. Lee Humphries and Rolf M. Pitts

[57] ABSTRACT

A terrain avoidance system for airborne use and employing a forward-looking, nodding, non-radiating sensor (or radiometer) for sensing the direction of the horizon, in cooperation with a downward-looking radar altimeter, whereby the probability of over-the-horizon detection of a utilizing aircraft is minimized.

9 Claims, 7 Drawing Figures

PATENTED DEC 19 1972 3,706,988

INVENTORS
GUY P. BAYLE
ROBERT D. GUSTAFSON
BY RICHARD K. SMYTH

ATTORNEY

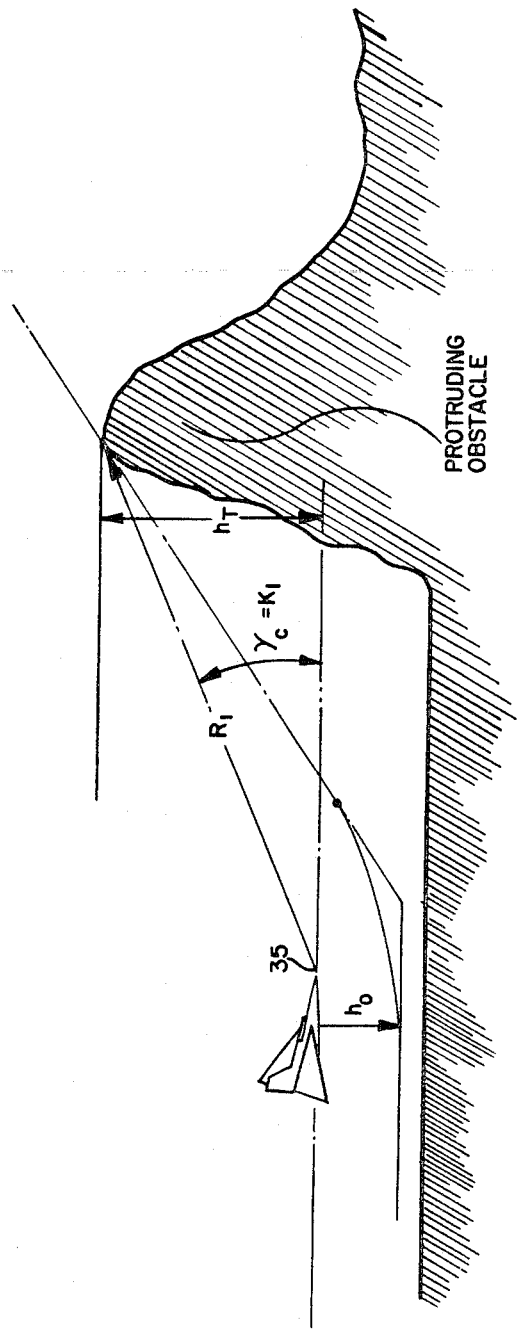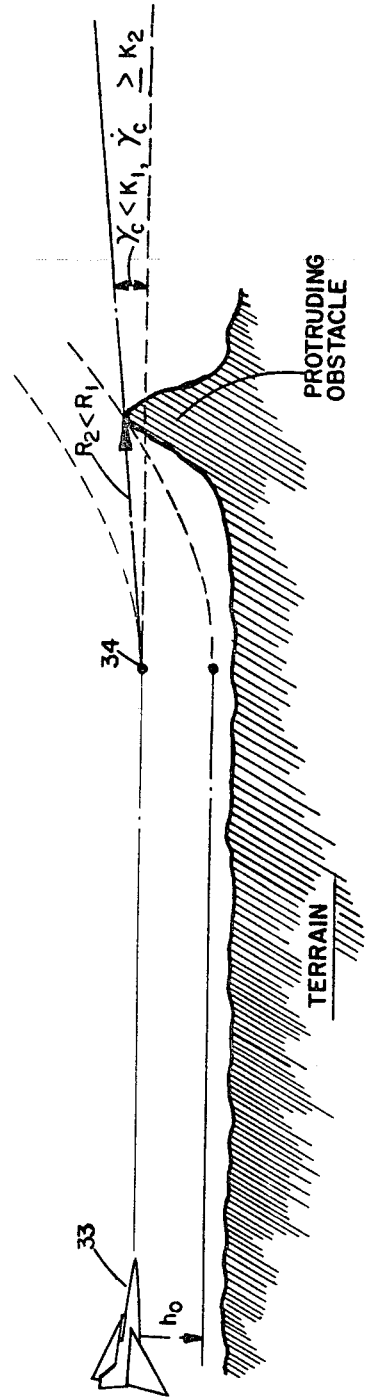

VEHICLE CONTROLLER EMPLOYING PASSIVE HORIZON SENSOR

BACKGROUND OF THE INVENTION

With the advent of modern radar systems for use in both offensive and defensive armament systems, the tactics of airborne military vehicles have necessarily changed. In order for an airborne military vehicle to penetrate deep into a hostile or enemy territory and effectively conduct a military mission, it is required that the vehicle or aircraft fly as low as possible in order to avoid detection by ground-based radar installations. In flying such a low-altitude flight profile, the flight path of the aircraft would desirably follow the profile of the terrain, so as to minimize exposure of the aircraft to a ground-based radar. The safe performance of such a flight profile has employed forward-looking airborne radar means for detecting terrain obstacles at sufficient advance ranges as to allow the pilot or autopilot to evasively manuever and avoid such obstacles.

Such forward-looking radar systems are employed to determine the associated range and direction of the terrain profile ahead of the utilizing vehicle, relative to a load-limited maximum manuever profile, whereby the vehicle is controlled so as to avoid the terrain without prematurely "flying-up," and thereby unnecessarily exposing itself. A description of such a radar system and associated radar data processor is included in copending U. S. Patent application Ser. No. 332,996, now U.S. Pat. No. 3,396,391, for a Terrain Following System filed Dec. 20, 1963 by J. O. Anderson et al, assignors to North American Aviation, Inc., assignee of the subject invention. Such a system provides terrain-following control signals for utilization in either a pilot's display mode or an automatic flight control mode. However, an associated disadvantage of such radar system is that, while the exposure of the vehicle itself may be minimized, yet the presence of the vehicle is indicated by the forwardly propogated energy transmitted by the radar. Such energy is transmitted above the horizon or transverse terrain profile, and may be sensed by a ground radar "listening" on the other side of a terrain obstacle. Such forwardly propagated energy may even be transmitted at extensive ranges beyond the horizon due to a waveguide effect between the atmosphere and underlying terrain under certain atmospheric conditions and referred to in the art as atmospheric tunnelling or "ducting." By means of such phenomena, a hostile ground radar may obtain substantial advance warning of an area-penetrating military aircraft even though such radar cannot see such aircraft by conventional radio-ranging techniques.

By means of the concept of the subject invention, passive forward-sensing means are employed to prevent a terrain-following vehicle from flying-up prematurely, while avoiding the prior-art forward propagation of energy, whereby the probability of detecting the vehicle is substantially minimized.

In a preferred embodiment of the invention there is provided a multimode flight control system for enabling a vehicle trajectory to be controlled so as to closely follow a terrain profile without the vehicle being obstructed by such terrain profile, and comprising forward-looking vertically scanning passive sensing means for providing a signal indicative of the vertical direction angle of the horizon. There is also provided switching means responsive to the direction angle for selectively switching the control system to an optimal one of an altitude control mode and flight path angle control mode as a function of the state of the direction angle.

By means of the above described arrangement, the vehicle may be controlled in the manner of an altitude controller when the horizon angle and rate of change of the horizon angle are relatively small, indicating that a terrain obstacle is far away. However, when the horizon angle becomes very large (indicating a required maneuver angle near the maximum climb angle performance of the aircraft), or when the rate of change of the horizon angle increases very rapidly (indicating that the range to a terrain obstacle is closing very rapidly), then the vehicle is controlled in accordance with the sensed vertical angle of the horizon. In this way, the vehicle is enabled to avoid terrain obstacles in a terrain-following maneuver or area penetration mission without either prematurely flying-up so as to expose itself or requiring actively ranging forward-looking sensors, whereby the presence of such vehicle may be otherwise detected. Accordingly, an object of the invention is to provide an improved control system for a terrain-following vehicle.

It is another object of the subject invention to provide a secure terrain-following system employing a passive sensor rather than an actively ranging sensor as a forward looking sensor.

It is still another object of the invention to provide passive forward sensing means for terrain-following control of a vehicle.

It is yet another object of the invention to provide a multi-mode longitudinal flight controller responsive to radiometric horizon-sensing means for optimum control mode switching of such flight controller.

It is a further object of the invention to provide passive horizon sensing means for optimum control mode switching of a multi-mode flight controller for a terrain-following vehicle.

These and other objects of the invention will become apparent from the following description taken in conjunction with the accompanying drawings in which:

FIGS. 4 and 5 are diagrams illustrating the geometry of the terrain-following control problem which is solved by means of the invention;

In the drawings, like elements refer to like parts.

Figure 1:
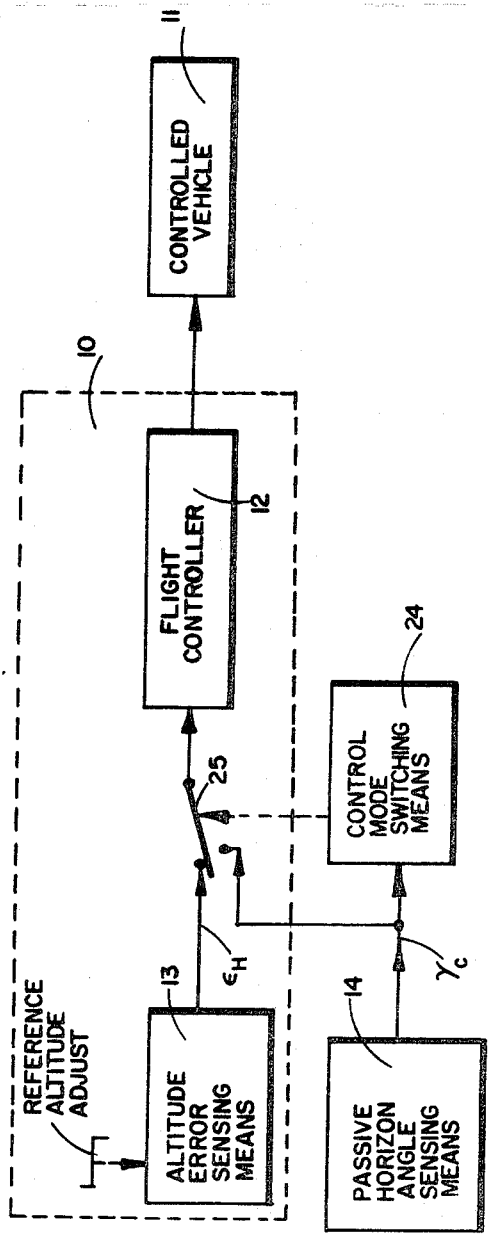
FIG. 1 is a block diagram of a system embodying the concept of the invention.

Referring to FIG. 1, there is illustrated in block diagram form a system embodying the concept of the invention. There is provided a multi-mode control system 10 for controlling a controlled vehicle 11 in a selected one of an altitude control mode and a flight path angle mode, and comprising a flight controller 12 having a switched input for cooperation with altitude signalling means 13 for providing an altitude control signal $\epsilon_H$ indicative of the deviation of vehicle 11 from a selected altitude $h_o$ above the terrain. Altitude signalling means 13 may be comprised of a downwardly-looking radar altimeter mounted on controlled vehicle 11, as is well understood in the art. There is also provided passive horizon angle sensing means 14 for providing a signal $\gamma_c$ indicative of the vertical direction angle of the sensed horizon ahead of vehicle. Such passive sensing means may comprise a vertically scanning radiometer, as shown more particularly in FIG. 2.

Figure 2:
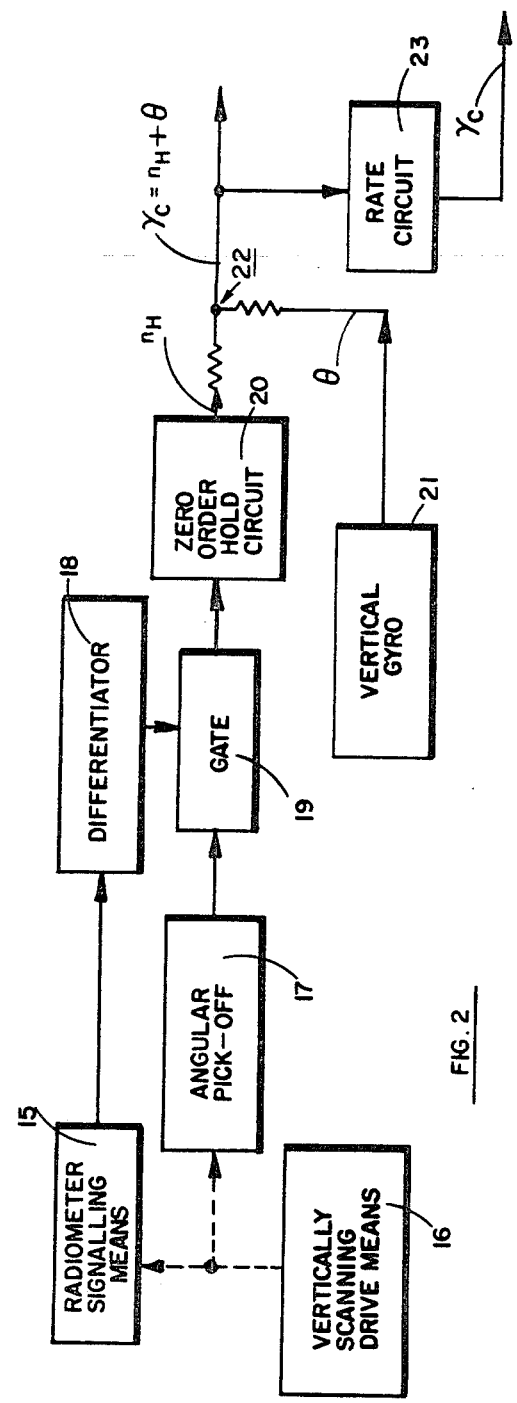
FIG. 2 is a schematic arrangement of an exemplary embodiment of the passive, forward looking, horizon direction sensing means of FIG. 1.
Figure 3:
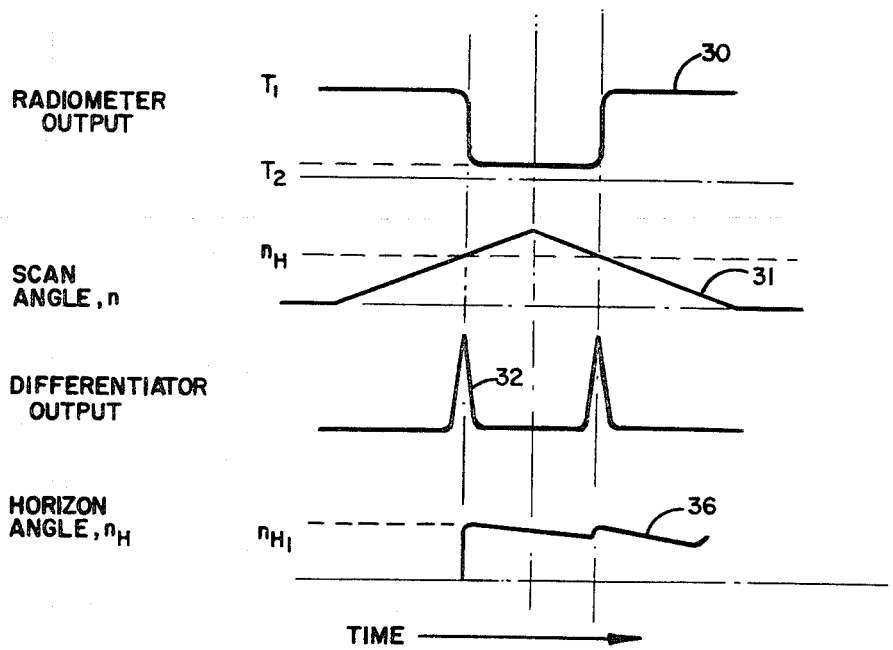
FIG. 3 is a family of time histories illustrating the response of the arrangement of FIG. 2.

Referring to FIG. 2, there is illustrated an exemplary arrangement of the passive horizon angle sensor 14 of FIG. 1. There is provided a forward-looking radiometer 15 which is vertically-scanned by scan drive means 16. The radiometer horizon sensor 15 responds to the natural thermal radiation emitted from that direction of the sky and/or terrain in which it is pointed. By vertically scanning the radiometer and noting the angle at which an abrupt change or discontinuity occurs in the radiometer output, one may determine the horizon angle at which the interface or boundary occurs between the larger sensed terrain thermal agitation level and the lesser sensed sky thermal temperatures. The design of radiometers is a well-known art and is based on the following design equation which gives the detection threshold based on the temperature differential of two adjacent mediums at thermal temperatures $T_1$ and $T_2$, where $T_2 - T_1 = \Delta T$, found for example in an article "Millimeter Radiometers" by E. W. Richter, published at pages 63–66 in the October 1960 issue of The Microwave Journal:

$$\Delta T = [K(FL-1)T]/B\tau \quad (1)$$

where:
 $K$ = an emperically determined constant
 $F$ = double channel noise figure of the system
 $L$ = RF loss preceeding the mixer
 $T$ = ambient temperature in degrees Kelvin
 $B$ = system bandwidth
 $\tau$ = smoothing time constant of detector Such radiometer may comprise, for example, the passive mode of an active radar designed for any usual radar frequency band, the antenna of which may be either electronically or mechanically scanned in elevation, to provide the periodic scanning angle signal indicated by curve 31 of FIG. 3. In the case of a mechanically scanned antenna, such scanning angle signal would be provided (in the arrangement of FIG. 2) by a pickoff 17 coupled to the drive means 16. Because the ground is at a higher thermal temperature than the sky, the radiometer output is greater when the radiometer antenna is declined or pointing toward the ground, rather than when it is inclined or pointed toward the sky (e.g., $T_1 > T_2$), as indicated by curve 30 in FIG. 3. Because the sky and ground are at different thermal temperatures, a discontinuity occurs in curve 30 as the radiometer antenna boresight is scanned in elevation past the antenna elevation angle $\eta$ defining the direction to the horizon or terrain sky interface (e.g., when curve 31 goes through angle $\eta_H$). By applying the output of sensor 15 to a differentiator 18, a gating signal (curve 32 in FIG. 3) may be generated for use in gating on a gated amplifier 19 which is responsively coupled to pick-off means 17. In this way, a sampled signal is provided at the output of amplifier 19 corresponding to the horizon angle $\eta_H$, which sampled signal may be fed to a zero order hold circuit 20 for smoothing purposes, the output response of which circuit is shown as curve 36 in FIG. 3. A unipolar output (curve 32 in FIG. 3) may be obtained from differentiator 18, in response to inputs having rates of change of mutually opposed sense, by the use of two output diodes in a full-wave rectifier circuit arrangement, as is well understood in the art.

When the orientation of the antenna of radiometer 15 is measured relative to a direction perpendicular to the local vertical, then the angle $\eta_H$ measured by the device is identically equal to a flight path command angle $\gamma_c$, corresponding to that flight path angle required to be flown in order to fly tangentially to the terrain obstacle so sensed. Where, alternatively, the orientation of the radiometer antenna is determined relative to the fuselage reference line (FRL) of the aircraft, then the output of an inertial reference such as the pitch angle pick-off of a vertical gyro 21 (indicating the pitch angle $\theta$ of the antenna) may be combined with the horizon angle direction signal $\eta_H$ from the radiometer system to generate the flight path angle command signal $\gamma_c$ by signal summing means 22:

$$\gamma_c = \theta + \eta_H \quad (2)$$

Additionally, a signal $\dot{\gamma}_c$, indicative of the rate of change of the angle $\gamma_c$, may be generated, for example, by means of a rate circuit 23 responsively coupled to the output of summing means 22. Alternately, discrete data processing means responsively coupled to the output of gated amplifier 19 may determine $\dot{\gamma}_c$ from the amplitude difference and time interval between successive sampled values of $\gamma_c$ as $(\gamma c2 - \gamma c1)/(t2 - t1)$ Referring again to FIG. 1, the signals indicative of the state of the horizon direction angle $\gamma_c$, provided by passive forward horizon sensing means 14 are fed to control mode switching means 24 for selecting an optimal one of the altitude control signals $\epsilon_H$ (from downward looking sensor 13) and horizon direction angle signals $\gamma_c$ (from forward looking sensor 14) to the input of flight controller 12, as may be more readily appreciated by reference to FIGS. 4 and 5.

Referring to FIGS. 4 and 5, there is illustrated the geometry of the terrain-following trajactory control problem. Where the controlled vehicle is sufficiently far from a horizon-angle defining obstacle which is sought to be avoided, or where the obstacle is sufficiently below the flight path of the vehicle, the vehicle may be safely controlled by an altitude mode controller (corresponding to flight controller 12 of FIG. 1 having an input thereof responsively connected to altitude error sensing means 13 such as a downward-looking radar altimeter). Because of the low clearance distances or reference altitudes employed for $h_o$ (in FIGS. 4 and 5), vehicle 33 (in FIG. 4) will normally be either below the beamwidth of a ground radar, or else obscured by the shadow effect of intervening terrain features. Also, because of such low control altitudes, the radar altimeter need not be a high energy level transmitting device, whereby any associated side lobe transmission is essentially of no practical effect in compromising the security of the area-penetrating vehicle.

Further, the reliance upon such altitude control mode until the vehicle 33 approaches to within a minimum pull-up distance (point 34 in FIG. 4 or point 35 in FIG. 5) from such terrain feature, assures that the vehicle will not prematurely fly up in avoiding the same, whereby the presence of the vehicle is exposed for an unnecessarily long time interval.

Where the horizon direction angle $\gamma_c$ exceeds a preselected limit, $k_1$, (determined by the combination of vehicle maneuver load-limit and maximum climb angle), the vehicle may be preferably controlled by a flight path angle mode controller (corresponding to the second or downward position of switch 25 in FIG. 1), whereby the vehicle is controlled to the horizon angle $\gamma_c$, as indicated in FIG. 5. In this way, the performance of the fly-up maneuver is delayed as long as is consistent with the flight safety and performance limits of the vehicle. Such a maneuver does not require a sustained maximum g load, but instead is essentially climb-angle limited, the maneuver being initiated at a range $R_1$ determined by such limit, as shown in FIG. 5. Where, however, the avoidance of a smaller terrain obstacle does not involve a climb-angle limited maneuver, a load-limited maneuver may be initiated at a shorter range, $R_2 < R_1$, as shown by point 34 in FIG. 4.

Where the horizon angle $\gamma_c$ is less than that at which a climb angle limited maneuver is initiated, the range $R_2$ at which an acceleration-limited maneuver should be initiated may be shown to be indicated by the rate of change of the horizon angle $\gamma_c$. The horizon angle $\gamma_c$ may be defined in terms of the slant range R and the height $h_T$ of the terrain obstacle relative to the viewing vehicle, as follows:

$$\gamma_c = \sin^{-1}(h_T/R) \quad (3)$$

However, because of the high speeds of the vehicles involved, the range R at which the pull-up maneuver is initiated is very large relative to $h_T$, and therefor small-angle approximations may be used for Equation (3). Hence, $$\gamma_c = h_T/R \quad (4)$$

Assuming that the vehicle 33 maintains a level flight path condition in progressing to point 34 in FIG. 4 ($h_T = K$), the rate of change of the angle $\gamma_c$ may be derived from Equation (4) as follows:

$$d\gamma_c/dt = [h_T d(R^{-1})dR](dR/dt) + 0 \quad (5)$$

$$\dot{\gamma}c = (h_T/R^2)(dR/dt) = h_T U/R^2 \quad (6)$$

where $dR/dt$ is substantially equal to $U$, the vehicle forward speed, for the small angle assumed. Substituting Equation (4) into Equation (6):

$$\dot{\gamma}_c = (\gamma_c U)/R \quad (7)$$

Accordingly, the range R is determined from rearranging Equation (7):

$$R = (\gamma_c U)/\dot{\gamma}_c \quad (7a)$$

In other words, for a given set of horizon angle $\gamma_c$ and vehicle velocity U, the range to the horizon decreases as $\dot{\gamma}_c$, the rate of change of the horizon angle, increases. The speed of a tactical vehicle will vary over a sufficiently small range of speeds as to be assumed constant. Therefore, the instant for initiating a g limited pull-up maneuver for relatively low terrain obstacle may be specified in terms of a preselected value $K_2$ for $\dot{\gamma}_c$, determined from the range $R_{mtn}$ associated with a g limited maneuver at a speed U against a terrain obstacle lying at a horizon angle not exceeding the maximum climb angle $+\gamma_{max}$ from Equation (7):

$$k_2 = (+\gamma_{max}U)/R_{mtn} \quad (8)$$

Figure 6:
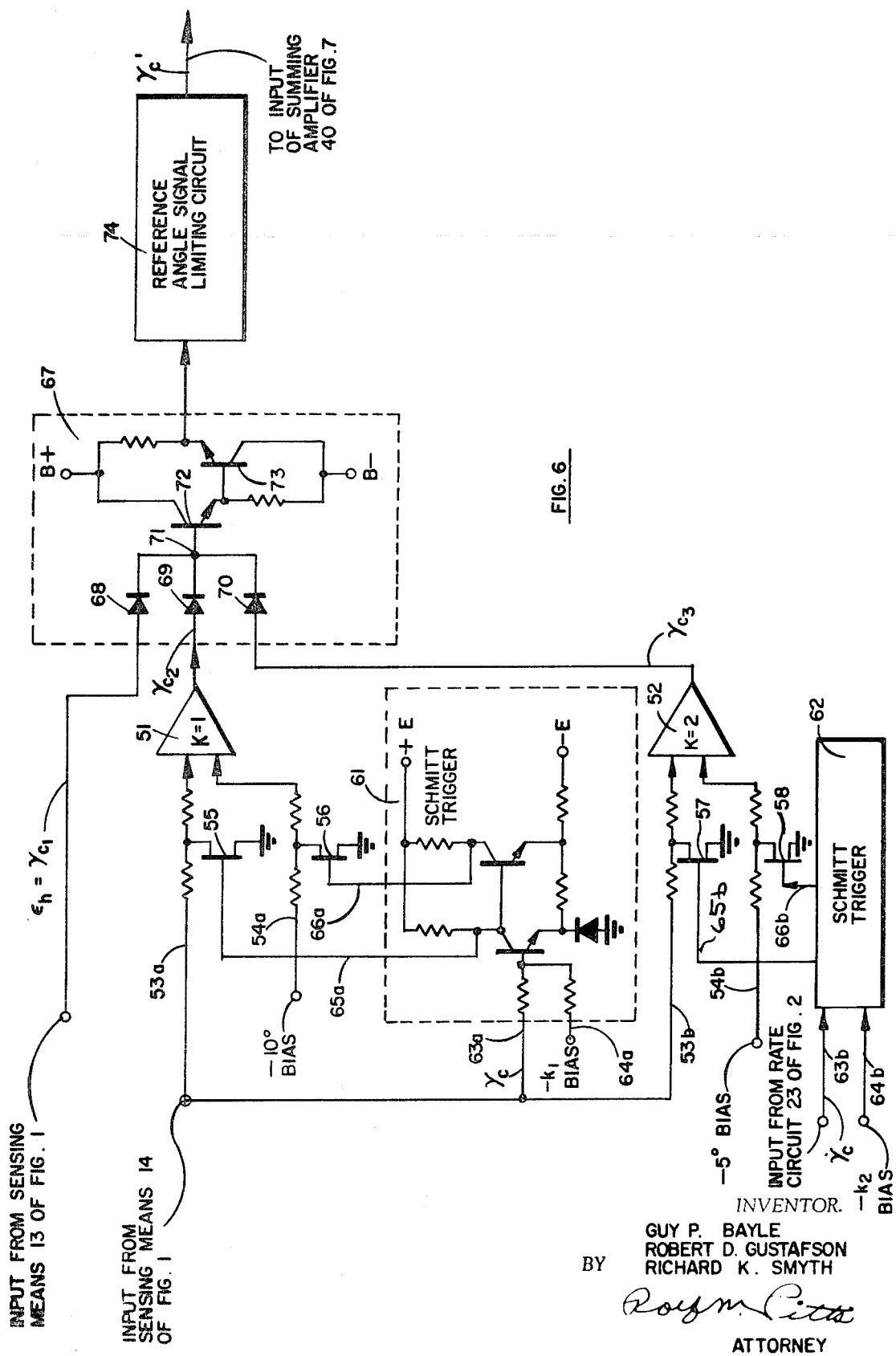
FIG. 6 is a schematic diagram of a preferred arrangement of the control mode switching means of FIG. 1.

Accordingly, the control mode switching means of FIG. 1 not only employs logic for switching flight controller 12 from an altitude control mode to a flight path angle control mode as a function of the state of the sensed horizon angle, $\gamma_c$, but may include further logic for also varying the flight path angle control mode as a further function of the state of horizon angle $\gamma_c$, as shown more particularly in FIG. 6.

Referring to FIG. 6, there is illustrated a preferred embodiment of the control mode switching means 24 and switch 25 of FIG. 1. There is provided a first and second summing amplifier 51 and 52, each having a first and second gated input 53 and 54, the gain of second summing amplifier 52 being greater than, say twice, that of first amplifier 51. The gating of the inputs to amplifiers 51 and 52 may be accomplished by any known means such as, for example, a field effect transistor 55, 56, 57 and 58 connected across such inputs. Each of the second gated inputs 54a and 54b of amplifiers 51 and 52 is coupled to a respective signal reference source or negative bias for providing an associated component output of like sense and amplitude for an associated one of the amplifiers and corresponding to the absence of a terrain obstacle.

There is also provided a first and second gating circuit 61 and 62, each having a first and second input 63 and 64, and providing a first and second gating output signal on output lines 65 and 66 of mutually opposite states for oppositely gating respective ones of the gated inputs of a respective one of amplifiers 51 and 52 in accordance with the sense of the difference between two applied inputs to such gating circuit. For example, first gating circuit, or Schmitt trigger, 61 is responsive to the sense of the amplitude difference between the sensed horizon angle signal $\gamma_c$, and a signal representing a first preselected reference, $k_1$, for providing a respective first and second gating signal of mutually opposite states on a respective one of output lines 65a and 66a. Second Schmitt trigger 62 is responsive to the sense of the amplitude difference between the rate of change $\dot{\gamma}_c$, of the horizon angle $\gamma_c$ and a second preselected reference, $k_2$, for providing a respective first and second gating signal of mutually opposite sense on a respective one of output lines 65b and 66b.

Accordingly, amplifier 51 and gate 61 cooperate to transmit horizon angle signals of positive sense at a selected gain, when such angle exceeds a selected reference amplitude, indicated by the sense of the algebraic sum of ($\gamma_c - k_1$); otherwise, gate 61 switches amplifier 51 to provide a negative polarity output. Similarly, amplifier 52 and gate 62 cooperate to transmit the horizon angle signals of positive sense and at an increased gain (relative to the gain of amplifier 51), when the angular rate $\dot{\gamma}_c$ exceeds a selected reference rate, indicated by the sense of the algebraic sum of ($\dot{\gamma}_c - k_2$); otherwise gate 62 switches amplifier 52 to provide a negative polarity output. Negative values of the angle $\gamma_c$ and the angular rate $\dot{\gamma}_c$ will not interfere with, or vary, the normally negative polarity output states of amplifiers 51 and 52, since such geometric conditions do not represent a warning condition, requiring a fly-up maneuver. In other words, a condition of negative values of each of $\gamma_c$ and $\dot{\gamma}_c$ is not of explicit interest for flight path angle control purposes.

There is further provided in the arrangement of FIG. 6, signal selecting means 67 comprising three like-poled diodes 68, 69 and 70, each having a like electrode commonly coupled to an output terminal 71, and further having a second electrode coupled to the output of a mutually exclusive one of amplifiers 51 and 52 and altitude signalling means 13 (of FIG. 1). If desired, a signal amplifying and impedance isolation stage may be interposed at the output terminal 71 by means of two complementary transistors 72 and 73, connected as shown to assure inherent temperature compensation.

In normal operation of the arrangement of FIG. 6, the several signal inputs applied to inputs of signal selector 67 tend to mutually back-bias each other, whereby the most positive signal, or terrain warning signal having the largest positive amplitude, effectively biases the diodes associated with the other signals and itself is conducted through the diode to which it is applied, to appear as the output signal on output terminal 71. Such signal may then be employed as a flight path angle reference or flight control system input signal. However, in a preferred design it may be desired to process such flight reference signal through a bi-polar limiting circuit 74 for limiting such reference relative to the flight path angle performance limits of the vehicle intended to be controlled thereby. Such limiting devices are well known in the art, being illustrated for example in FIG. 6.23.f at page 292 of "Electronic Analog Computers" by Korn and Korn, published by McGraw-Hill, second edition (1957). Accordingly, signal limiting circuit 74 is shown in block form only, for processing the flight path reference signal to be utilized by the flight controller 12 of FIG. 1, which controller is shown in greater particularity in FIG. 7.

Figure 7:
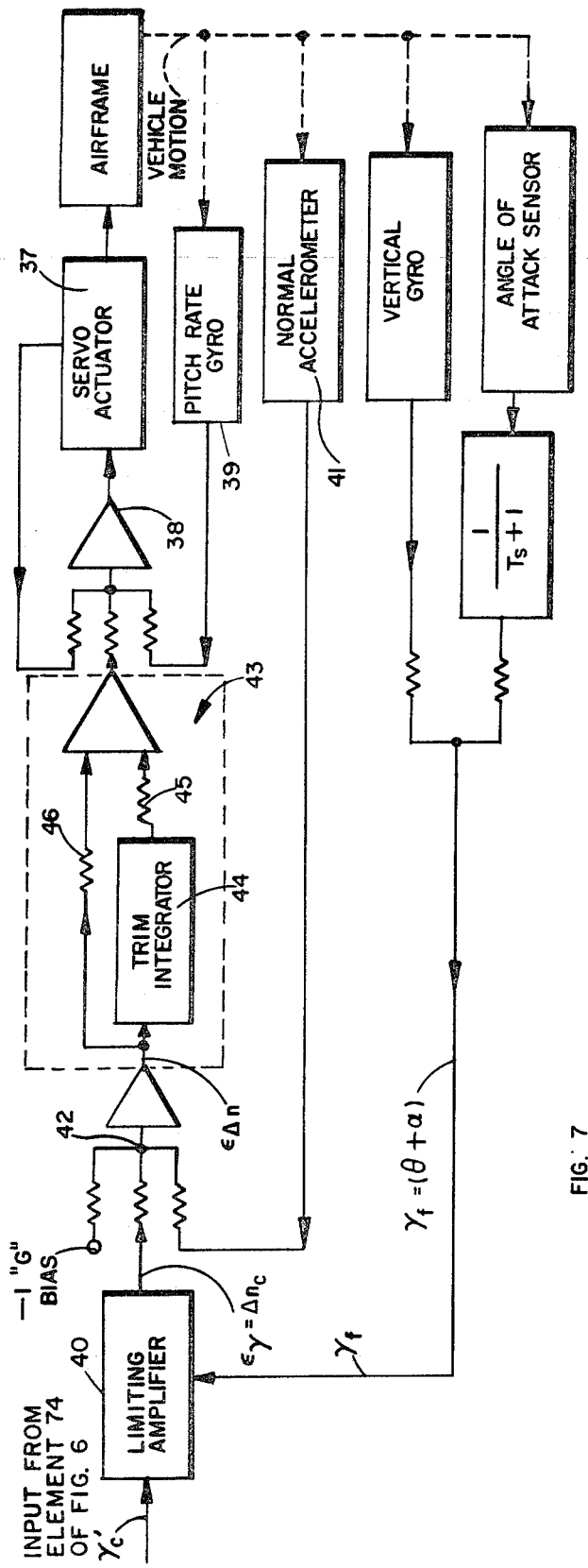
FIG. 7 is a block diagram of a preferred arrangement of the flight controller of FIG. 1.

Referring to FIG. 7, there is illustrated a preferred embodiment of the flight controller 12 of FIG. 1. There is provided an attitude-rate stabilized vehicle controller comprising an aircraft elevator servo actuator 37 in closed loop cooperation with a summing amplifier 38, one input of which amplifier is coupled to the output of a pitch rate gyro 39. A vertical gyro and lag-network equalized output of an angle-of-attack sensor may be included in a feedback path of the flight controller for purposes of closed loop attitude control, as is well understood in the art. However, consideration of such purposes does not constitute an aspect of the disclosed invention. An additional input to servo amplifier 38 is provided by a normal acceleration control loop comprising an incremental load reference signal source 40, and normal accelerometer 41, the outputs of which are differentially combined or compared at summing point 42. The resulting difference signal $\epsilon_{\Delta\eta}$ is then fed to servo amplifier 38 through a proportional-and-integral signalling channel 43 comprising integrator 44 and summing resistors 45 and 46. The arrangement and cooperation of a proportional-and-integral controller to preserve high frequency stability and system dynamic response while providing a high-gain d-c trim signal for reducing static errors, is well understood in the art, being described and illustrated for example in U.S. Pat. No. 3,175,526 issued Mar. 30, 1965, to J. M. Johnson, Jr., et al for Automatic Altitude Control System for a Hydrofoil Vessel.

The incremental load reference source 40 comprises a limiting amplifier for providing an output indicative of the difference between a first input thereto (corresponding to a desired flight path angle) and a feedback signal, $\gamma_f$, indicative of the actual flight path angle of the controlled vehicle. The limits of limiting amplifier 40 are adjusted to provide an amplitude-limited differential output, $\Delta\eta_c$ corresponding to desired limits on such acceleration reference signal, which limits may be selected from considerations of the vehicle structural load limits and pilot comfort.

Hence, it is to be understood that the acceleration-limited flight controller of FIG. 7 cooperates with the flight-angle limited flight reference source 74 of FIG. 6 to provide a controlled flight trajectory within selected trajectory performance limits.

Accordingly, there has been described a system useful in the performance of automatic terrain-following trajectories. Because the flight reference employed is selected from the sensed horizon angle and the sensed vehicle altitude over the terrain on the basis of the state of such sensed angle, a premature fly-up maneuver is avoided. Also, the cooperation of a forward looking horizon angle sensor and an altimeter, in such terrain-following function, allows the performance of a reasonably secure area penetration mission. Further, the programming of the gain of the horizon angle as a function of the rate of change of such angle, avoids the necessity of expressly determining the slant range to a terrain obstacle.

Although the invention has been described and illustrated in detail it is to be clearly understood that the same is by way of illustration and example only and is not to be taken by way of limitation, the spirit and scope of this invention being limited only by the terms of the appended claims.

We claim:

1. In a multi-mode control system for enabling a vehicle trajectory to be controlled so as to closely follow a terrain profile without the vehicle being obstructed by such terrain profile, the combination comprising:

Forward-looking vertically-scanning passive sensing means for providing a signal indicative of the vertical direction angle of the horizon; and Control mode switching means responsive to said direction angle signal for selectively switching said control system to an optimal one of an altitude control mode and flight path angle control mode for avoiding prematurely flying up in response to a sensed terrain obstacle.

2. In a multi-mode control system having both an altitude control mode and a flight path control mode for enabling a vehicle trajectory to be controlled so as to closely follow a terrain profile without the vehicle being obstructed by such terrain profile, the combination comprising:

Forward-looking vertically-scanning passive sensing means for providing a signal indicative of the vertical direction angle of the horizon; and Control mode switching means responsive to the state of said direction angle for selectively switching said control system to an optimal one of an altitude control mode and flight path angle control mode for avoiding prematurely flying up in response to a sensed terrain obstacle.

3. In a vehicle-borne multi-mode control system for enabling a vehicle trajectory to be controlled so as to closely follow a terrain profile without the vehicle being obstructed by such terrain profile, said system having altitude signalling means for providing an altitude control signal indicative of the deviation of said vehicle from a selected altitude above the terrain, the combination comprising:

Forward-looking vertically-scanning passive sensing means for providing a signal indicative of the vertical direction angle of the horizon;

Control mode switching means for selectively feeding preselected one of said control and direction angle signals to the input of said control system in response to a preselected state of said sensed direction angle.

4. The device of claim 3 in which said switching means comprises

Gating means responsive to a preselected function of said direction angle and a reference signal for gating said direction angle signal in response to an amplitude sense of a preselected sense between said preselected function and said reference signal; and Signal selecting means responsive to said altitude control signal and said gated direction angle signal for selectively coupling to the input of said control system that one of said control and gated direction angle signals corresponding to a maximum fly-up maneuver.

5. In a vehicle-borne system for enabling a vehicle trajectory to be controlled so as to closely follow a terrain profile without the vehicle being obstructed by such terrain profile, said system having altitude signalling means for providing an altitude control signal indicative of the deviation of said vehicle from a selected altitude above the terrain, the combination comprising:

Forward-looking vertically-scanning passive sensing means for providing a signal indicative of the vertical direction angle of the horizon;

Means responsive to said direction angle signal for providing a signal indicative of the rate of change of said direction angle; and Switching means for selectively feeding an alternate one of said control and direction angle signals to the input of signal utilization means for control of said vehicle, said control signal being fed in response to a combination of preselectively small direction angle and preselectively low angular rate.

6. The device of claim 5 in which said switching means comprises, in combination:

A first and second summing amplifier, each having a first and second gated input, the gain of said second amplifier being greater than that of said first amplifier, said first gated inputs of said amplifiers being commonly responsive to said direction angle signal, each of said second gates inputs of said amplifiers being coupled to a respective signal reference source for providing an associated component output for an associated one of said amplifiers of like amplitude and sense and corresponding to the absence of a terrain obstacle;

A first and second gating circuit, each having a first and second input and providing a first and second gating output signal of mutually opposite states for oppositely gating respective ones of said gated inputs of a respective one of said amplifiers, in accordance with the sense of the difference between two applied input signals to said gating circuit, said first gating circuit being responsive to the sense of the amplitude difference between the horizon angle and a first preselected reference, and said second gating circuit being responsive to the sense of the amplitude difference between the rate of change of said horizon angle and a second preselected reference; and Signal selecting means comprising a plurality of like-poled diodes, each having a like electrode commonly coupled to form an output terminal and a second electrode coupled to a mutually exclusive one of said summing amplifiers and said altitude signalling means for selecting that one of the input signal representing the greatest fly-up maneuver signal as an output signal to the the input of said utilization means.

7. In a vehicle borne system for enabling a vehicle trajectory to be controlled so as to closely follow a terrain profile without the vehicle being obstructed by such terrain profile, the combination comprising Altitude signalling means for providing an altitude control signal indicative of vehicle deviation from a selected altitude above the terrain;

Forward-looking vertically scanning passive sensing means for providing a signal indicative of the vertical direction angle $\gamma_c$ of the horizon;

Means responsive to said direction angle signal for providing a signal indicative of the rate of change $\dot{\gamma}_c$ of said direction angle;

Gating means responsive to said direction angle and angular rate signals for providing control signals indicative of an alternative one of three logic states, the first state corresponding to a preselectively large direction angle and a preselectively low rate of change of $\gamma_c$, the second corresponding to a preselectively high rate of change of $\gamma_c$, and the third corresponding to said preselectively small direction angle and said preselectively low rate of change of $\gamma_c$; and Signal selecting means responsive to said control signals for selectively feeding an alternate one of said altitude control and said direction control signals to the input of signal utilization means for control of said vehicle, said direction control signal being selected during said first and second states, the gain of said selected direction signal being increased in said second state.

8. In a system adapted for airborne use for enabling a vehicle trajectory to be controlled so as to closely follow a terrain profile without the vehicle being obstructed by such terrain profile, said system having altitude signalling means for providing an altitude control signal indicative of the deviation of said vehicle from a selected altitude above the terrain, the combination comprising forward-looking vertically-scanning passive sensing means for providing a signal indicative of the vertical direction angle of the horizon;

means responsive to said direction angle signal for providing a signal indiative of the rate of change of said direction angle;

means responsive to said first and second mentioned means for feeding a selected one of said altitude control and direction angle signals to an input of signal utilization means for control of said vehicle, said direction angle signal being fed in response to each of a preselectively large direction angle and preselectively high directional angular rate of change.

9. The device of claim 8 in which said last mentioned means comprises gain adjusting means responsive to said direction angle signal and to said rate of change for preselectively increasing the gain of said direction angle signal in response a direction angle rate of change having a preselected sense and at least a preselected minimum magnitude; and logic means for selectively feeding the greater of said altitude control, direction angle, and gain-increased direction angle signals as as input to said signal utilization means.

* * * * *